G. Hadfield,
Depurator.
No. 3,139. Reissued Sep. 29, 1868.
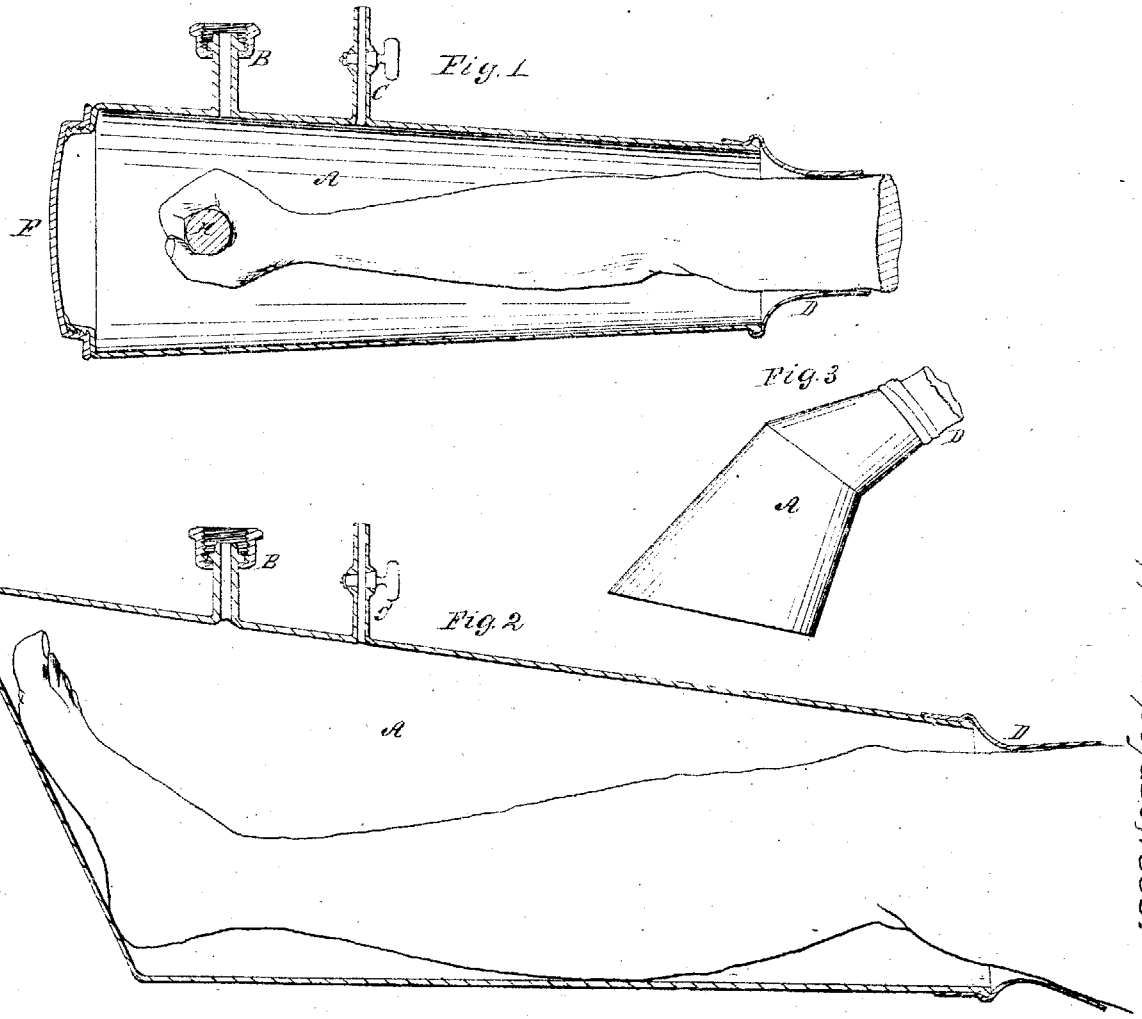
Witnesses;
Frank Williams
Jas H. Hayman
Inventor;
George Hadfield
By Knight Bros Attys

United States Patent Office.

GEORGE HADFIELD, M. D., OF CINCINNATI, OHIO.

*Letters Patent No.* 59,388, *dated November* 6, 1866; *reissue No.* 3,139, *dated September* 29, 1868

IMPROVEMENT IN MEDICAL VACUUM-CHAMBERS.

The Schedule referred to in these Letters Patent and making part of the same.

TO ALL WHOM IT MAY CONCERN:

Be it known that I, GEORGE HADFIELD, M. D., of Cincinnati, in the county of Hamilton, and State of Ohio, have invented certain new and useful Improvements in Medical Vacuum-Chambers; and I do hereby declare that the following is a full, clear, and exact description thereof, reference being had to the accompanying drawings forming part of this specification.

My improvements relate to the class of devices known as medical vacuum-chambers or dry-cupping apparatus, for temporarily removing the atmospheric pressure from any desired part or member of the human body, and my present invention is more particularly directed to apparatus adapted for use upon an arm or leg.

Figures 1 and 2 are longitudinal sections of vacuum-chambers intended for application to an arm and a leg respectively.

Figure 3 represents a chamber adapted for use on a stiff leg.

Similar letters of reference indicate corresponding parts.

A is the chamber proper, being a deep box or trunk, composed of tin or other rigid and air-tight material.

B is a coupling, for attachment of a hose, connected with an air-pump, or other means of creating a vacuum or partial vacuum in the chamber.

C is a faucet, accessible both to the patient and to the operator, to enable a partial restoration of the natural pressure, whenever the rarefaction has become too painful to the patient.

The apparatus is made self-sealing, by means of an India-rubber lip, D, around the entrance or margin of the chamber, which lip, the instant that the air is rarefied by the operator, closes automatically around the limb of the patient, and excludes the external air.

In order to prevent injury to a paralyzed hand, by being drawn or forced, in a constrained or cramped condition, against the end of the vacuum-chamber, I provide a suitable cross-bar, handle, rest, or support for the hand of the patient.

When the patient is unable properly to grasp the handle or rest, the hand may be arranged thereupon by the operator; and for this purpose, I provide a self-sealing screw or cap, F, which, being unscrewed, affords access for the operator, to adjust the hand and fingers of the patient upon the rest or handle.

When the limb, whether arm or leg, is permanently crooked, the vacuum-chamber may be made in the angular form represented in fig. 3.

Having thus described my invention, I claim as new, and desire to secure by Letters Patent—

The employment of a hand-support or rest, substantially as and for the purposes set forth.

Also, the sealing-cap F, substantially as and for the purposes set forth.

The above specification of my invention signed by me, this 5th day of February, 1868.

GEO. HADFIELD, M. D.

Witnesses.

WM. F. MCNAMARA,

ALEX. F. ROBERTS.